United States Patent
Yu et al.

(10) Patent No.: US 8,122,093 B2
(45) Date of Patent: Feb. 21, 2012

(54) INSTANT MESSAGING INTERACTION SYSTEM AND METHOD THEREOF

(75) Inventors: Hung-Hsiu Yu, Hsinchu (TW); Hsin-Yi Lin, Hsinchu (TW); Hsuan-Kuan Huang, Hsinchu (TW); Ching-Yi Kuo, Hsinchu (TW); Ching-Yi Liu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 263 days.

(21) Appl. No.: 12/504,983

(22) Filed: Jul. 17, 2009

(65) Prior Publication Data
US 2010/0235451 A1 Sep. 16, 2010

(30) Foreign Application Priority Data
Mar. 12, 2009 (TW) ................................ 98107997 A

(51) Int. Cl.
*G06F 15/16* (2006.01)
(52) U.S. Cl. ......................... 709/206; 704/260
(58) Field of Classification Search ........................ None
See application file for complete search history.

(56) References Cited

U.S. PATENT DOCUMENTS

| | | | |
|---|---|---|---|
| 6,907,571 B2 | 6/2005 | Slotznick | |
| 7,720,784 B1* | 5/2010 | Froloff | 706/47 |
| 2004/0111479 A1* | 6/2004 | Borden et al. | 709/206 |
| 2007/0299919 A1 | 12/2007 | Kellogg et al. | |
| 2009/0048840 A1* | 2/2009 | Lin | 704/260 |

* cited by examiner

*Primary Examiner* — Ario Etienne
*Assistant Examiner* — Clayton R Williams
(74) *Attorney, Agent, or Firm* — Rabin & Berdo, P.C.

(57) ABSTRACT

An instant messaging interaction system and method work by: analyzing communicative information sent by a remote user to create emotional messages and analyzing information about the remote user's identity; storage in a storage module behavior weight value preset and corresponding to the information about the remote user's identity; determining, by a learning module, interactive responses according to the emotional messages and the behavior weight values; outputting, by an output module, the interactive responses; detecting if receiving a feedback signal from an local user; if the feedback signal is not received, the learning module stores the behavior weight value in the storage module; if the feedback signal is received, the feedback module generates a modification value corresponding to different levels of the feedback signal; generating, by the learning module and according to a detection result, modification values for modifying the behavior weight values. As a result, the messaging interaction system is capable of presenting rated interactive responses in a personalized, artificial intelligence-based manner that meets the local user's expectation.

22 Claims, 7 Drawing Sheets

INSTANT MESSAGING INTERACTION SYSTEM AND METHOD THEREOF

BACKGROUND OF THE INVENTION

1. Field of the Invention

The present invention relates to instant messaging interaction systems and methods thereof, and more particularly, to an instant messaging interaction system and a method thereof applicable to a data processing device for executing information messaging software and configuring to enable a local user and a remote user to jointly create communicative information by the information messaging software.

2. Description of the Prior Art

Owing to the progress of network-based communication technology, long-distance information messaging has become an integral part of the daily life of most people, involving simple steps: accessing information messaging software; logging in a related website on the Internet; and communicating with another user online. There are several types of information messaging software, and all of them enable users to chat with one another using specific symbols (or emoticons) and messages as a means of emotional interactive expression and provide graphic messaging interfaces for online messaging. Nonetheless, conventional ways of interaction, as governed by network-based communication technology, are limited to two-dimensional interfaces and undesirably monotone.

To render interaction vivid and funny, commercially available interactive toys, such as I-Buddy and I-Knock, gave different interactive responses (e.g., flapping wings, twisting body, or emitting light) according to specific symbols (or emoticons) and messages. Yet the interactive responses can only be presented on a one-to-one manner or user-defined, not to mention that a single message is greeted with the same interactive responses from whoever receive the message; more badly, the interactive responses are neither interesting nor intuitive, and therefore puzzle users. Hence, the conventional interactive responses based on network-based communication technology are of no avail and bring no fun.

To address the above issue, US20070299919 disclosed a method for giving a specific response automatically according to a specific message sent by a specific user. The method disclosed in US20070299919 is applicable to an instant messaging-based customer service system and characterized in that, in the absence of a customer service clerk, the instant messaging software of a computer determines the identity of a customer presently asking a customer service-related question and the content of the question. Then, the software automatically gives a specific response to the customer according to the outcome of the determination. However, a drawback of the method disclosed in US20070299919 is of that there should be a predefined action list created in the form of a table specifying the customer service-related questions and its respective related service responses. Thus, service responses are delivered to the customer by the automatic instant messaging-based customer service system. Therefore, the service responses to customers are specific a priori and limited. Also, system-customer interaction shows uniform standard and is not sensitive to the customers' ever-changing emotion.

Another invention of U.S. Pat. No. 6,907,571 also disclosed a chatterbot which is capable of instant messaging. The chatterbot, particularly, chats not only with users but also with other chatterbots by instant messaging. The chatterbot of U.S. Pat. No. 6,907,571 which is able to identify users and other chatterbots are functioned by an artificial intelligence (AI) mechanism, so that differential responses could be sent to different receivers according to the users' and the other chatterbots' identities. However, although the chatterbot has learning ability with its related AI mechanism, it still has to work with a preset database containing the associated relation of active responses and conversational contents. The chatterbot also lacks a user interface for the users to have response feedbacks; thus, the performance of the chatterbot falls short of users' expectations. That is, the interactive responses given by the chatterbot during conversation can not provide the strong imaging to the users.

Accordingly, providing an instant messaging interaction system and a method thereof to embody presentation of various responses to a single message or emoticon in a more emotional and user-anticipated manner is the main purpose of the invention and the issue in which the related industries of instant messaging hardware/software are interested.

SUMMARY OF THE INVENTION

In light of the aforesaid drawbacks of the prior art, the primary purpose of the present invention is to provide an instant messaging interaction system and a method thereof used to determine, by learning and user feedback mechanism, the identities of different remote users engaging in instant messaging. Thereby, the system and method provide interactive responses in an emotion-rated and user-anticipated manner and are humanized and artificial intelligence-based.

Another purpose of the present invention is to provide an instant messaging interaction system and a method thereof without cooperating with an action list or recipient list created by tabulation a priori. Instead, but the system displays interaction responses to a single message or emoticon with more emotional manners.

To achieve the above purposes, the present invention provides an instant messaging interaction system which is applicable to a data processing device and capable of executing information messaging software in order to provide a local user an interaction with a remote user through the information messaging software. The system comprises: an instant messaging module for receiving or sending communicative information; an analysis module analyzing the communicative information responded by the remote user to generate at least an emotional message and to identify an identity information of the remote user; a storage module for storing a behavior weight value which is preset to correspond to the identity information of the remote user; a learning module for determining an interactive responses according to the emotional message and the behavior weight value and to generate a physical action according to the interactive responses; an output module for outputting the physical action according to the interactive response determined by the learning module; and, a feedback module for detecting whether receiving a feedback signal sent by the local user for reacting the outputs and the physical action according to the interactive response from the output module, wherein if the feedback signal is not received, the learning module stores the behavior weight value in the storage module; if the feedback signal is received, the feedback module generates a modification value corresponding to different levels of the feedback signal. The modification value is then sent to the learning module to modify the behavior weight value which is also stored in the storage module.

The present invention also provides an instant messaging interaction system applicable to a data processing device capable of executing an information messaging software to provide a local user and a remote user to jointly create communicative information, and is adapted to allow an interaction device accessible by the local user to respond differently to the communicative information responded by the remote user. The instant messaging interaction system comprises: an instant messaging module for receiving or sending communicative information; an analysis module for analyzing the communicative information responded by the remote user so as to generate at least an emotional message, and then for the at least an emotional message to generate a corresponding mark input value based on specific behavioral attributes and identify information of the remote user; a storage module for storing the specific behavioral attributes and behavior weight value corresponding to the identify information of the remote user; a learning module for retrieving coded information from the storage module as soon as the learning module determines that the inputs matches one of the behavior weight values stored in the storage module; an output module for outputting a physical action corresponding to the coded information retrievable by the learning module and output by the interaction device accessible by the local user; and a feedback module for detecting, upon the outputting of the interactive response by the output module, whether the interaction device accessible by the local user receiving the feedback signal from the remote user, wherein of a negative detection of receiving the feedback signal the behavior weight value is stored according to the mark input value, and if a positive detection of receiving the feedback signal different values are generated according to the result of detection so as to modify the behavior weight value and change the physical action output by the output module.

To achieve the above purposes, an instant messaging interacting method, applicable to a data processing device capable of executing information messaging software to provide a local user an interaction with a remote user through the information messaging software. The method comprises the steps of: analyzing communicative information sent by the remote user so as to generate at least one emotional message, and identifying the remote user's identity; retrieving a behavior weight which is preset to correspond to identify information of the remote user from a storage module; determining an interactive response according to the emotional message and the behavior weight value so as to generate a physical action according to the interactive response, and outputting the physical action according to the interactive response; and detecting whether receiving a feedback signal from the local user, wherein the feedback signal is not received, the learning module stores the behavior weight value of the current response in the storage module; if the feedback signal is received, the feedback module generates a modification value corresponding to different levels of the feedback signal, which the modification value is then sent to the learning module to modify the behavior weight value which is also stored in the storage module.

The present invention also provides an instant messaging interacting method applicable to a data processing device capable of executing information messaging software to provide interactions between a local user and a remote user, adapted to allow an interaction device accessible by an local user to respond differently to the communicative information responded by an remote user, and configured for use with a storage module functioning in conjunction with the data processing device and the interaction device. The instant messaging interacting method comprising the steps of: storing, by a storage module, coded information corresponding to the behavior weight value corresponding to specific behavioral attributes and the identify information of the remote user; analyzing communicative information responded by the remote user so as to generate at least an emotional message, and then for the at least an emotional message to generate a corresponding mark input value based on specific behavioral attributes and the identify information of the remote user; retrieving coded information from the storage module upon determination that the mark input value matches one of the behavior weight values stored in the storage module; outputting a physical action corresponding to the coded information by the interaction device accessible by the local user; and detecting whether the interaction device accessible by the local user receiving the feedback signal from the remote user so as to store, if a negative detection, the behavior weight value according to the mark input value or to generate, if a positive detection, different modification values according to the detection result for modifying the behavior weight value and thereby changing the physical action.

In an embodiment of the instant messaging interaction system and method of the present invention, the instant messaging module enables the user to enter the communicative information into the data processing device, and the data processing device is a computer, a cell phone, a personal digital assistant (PDA), or a digital device for executing information messaging software. Preferably, the communicative information is textual information, numeral information, graphical information, symbolic information, video information, and/or audio information.

In a preferred embodiment of the instant messaging interaction system and method of the present invention, the corresponding physical action is able to manifest responses and behaviors under different personalities in interactive instant messaging. Preferably, the physical action is carried out in the form of mechanism-triggered action, audio output, word output, speech output, textual output, video output, light output, and/or spreading of scent.

In a preferred embodiment of the instant messaging interaction system and method of the present invention, the behavior weight value correlates with responding behavior in different levels of emotion, depending on specific behavioral attributes and the identify of the remote user, and, on the other hand, the detection result of the feedback signal to the modification value in a corresponding level depends on a physical contact detected by the interaction device. Preferably, the physical contacts may include a tap, a beat, a heavy press, and/or continuous strikes. The detection result of the feedback signal to the modification value in the corresponding level is rated, depending on a time session.

In a preferred embodiment of the instant messaging interaction system and method of the present invention, the instant messaging interaction system further comprises an actuation unit electrically connected to the output module. The actuation unit is provided in the form of a mechanical structure, a display device, and/or an audio amplifier. Preferably, the mechanical structure is driven by external power. The display device is a LED, a LCD monitor, a LED monitor, a plasma monitor, and/or a CRT monitor. The audio amplifier is a loudspeaker.

Compared to the prior art, the present invention is characterized by: creating learning-oriented mark input values by receiving different remote users' instant communicative information or dialog; the interaction device giving responses according to the mark input values; and the users giving feedback (e.g., punishments or rewards) to enable the interaction device to learn to give appropriate and yet different responses according to remote users' identities. Advantages of the present invention are: supplementing tabulation with variety and graduations; bettering accuracy in the outcome of learning by rated user feedbacks; allowing the interaction device to learn and thereby to give responses that live up to users' expectations rather than random or seemingly meaningless responses; a learning mechanism that spares users the need to preset a list of remote users or an action list, and a feedback mechanism that enables users to guide the interaction device in learning the correct way to give responses; and embodying presentation of various responses to a single message or emoticon in a more emotional and user-anticipated manner.

DETAILED DESCRIPTION OF THE EMBODIMENTS

The present invention is herein illustrated with specific embodiments, so that one skilled in the pertinent art can easily understand other advantages and effects of the present invention from the disclosure of the invention.

Figure 1:
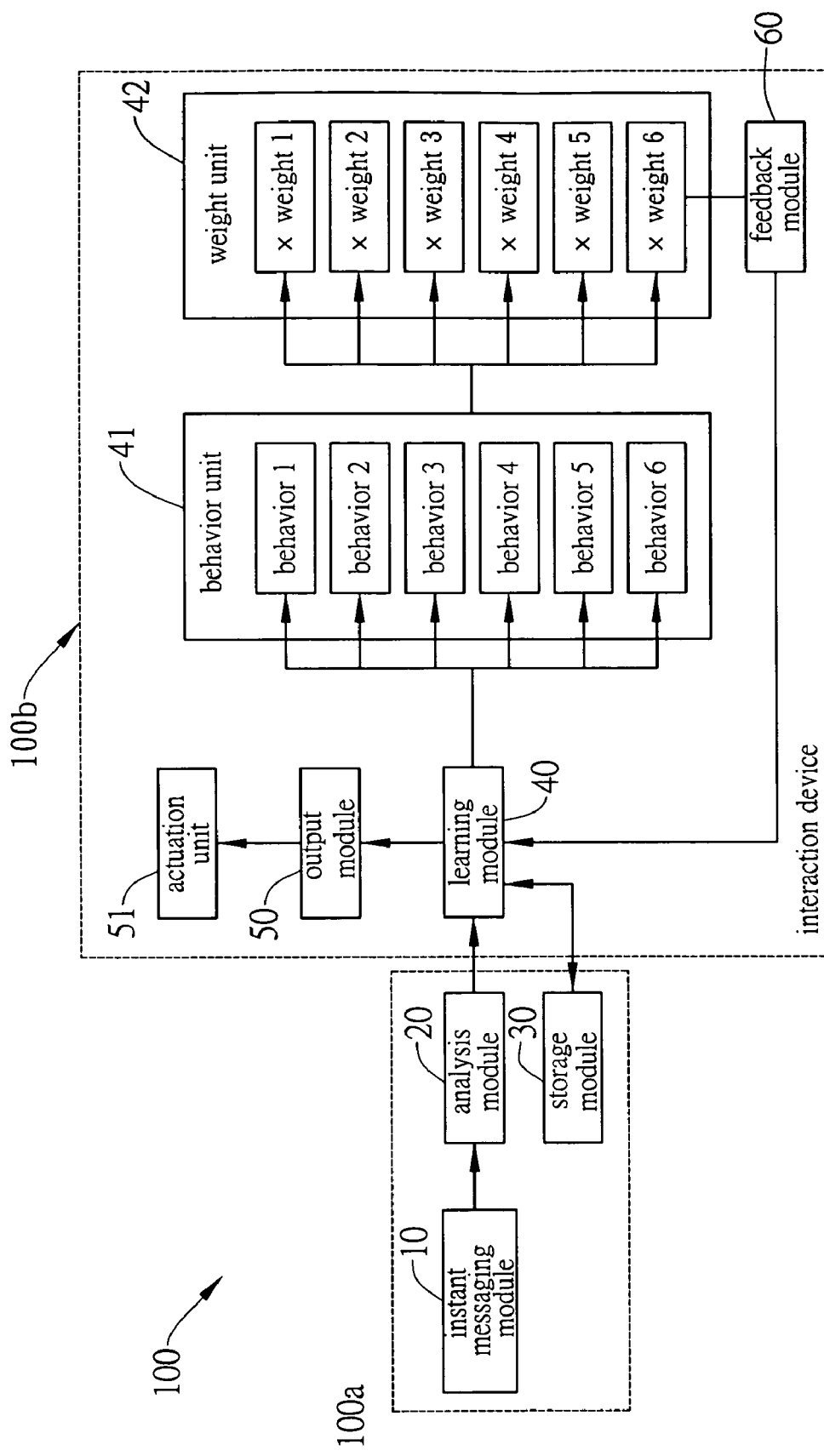
FIG. 1 is a block diagram of the framework of an instant messaging interaction system of the present invention.

Referring to FIG. 1, which is a block diagram of a preferred embodiment of an instant messaging interaction system 100 of the present invention, the instant messaging interaction system 100 is applicable to a data processing device 100a for executing information messaging software, configured to enable a local user and a remote user to jointly create communicative information by the information messaging software, and configured to allow an interaction device 100b accessible by the local user to respond differently to the communicative information responded by the remote user. The data processing device 100a enable the users to exchange and share information with each other by the information messaging software, for example, MSN (Microsoft Network) provided by Microsoft, Yahoo Messenger provided by Yahoo, Skype, QQ, or ICQ. The data processing device is a computer, a cell phone, a personal digital assistant (PDA), or a digital device for executing information messaging software.

Referring to FIG. 1 again, the instant messaging interaction system 100 comprises: an instant messaging module 10, an analysis module 20, a storage module 30, a learning module 40, an output module 50, and a feedback module 60. In an embodiment, the instant messaging module 10, the analysis module 20, and the storage module 30 are connected to the data processing device 100a, and the learning module 40, the output module 50, and the feedback module 60 are connected to the interaction device 100b. In another embodiment, the learning module 40, the output module 50, the feedback module 60, and the data processing device 100a are integrated into the interaction device 100b. The present invention is, however, not limited to the above embodiments. Elements of the instant messaging interaction system 100 are described in detail hereunder.

The instant messaging module 10 receives or sends the communicative information. Specifically speaking, the instant messaging module 10 comprises a messaging interface, such as Bluetooth, infrared, IEEE 802.11, WiMax, ZigBee, or any messaging interface for protocols. With the information messaging software, a local user and one or more specific remote users together create and share a dialog window for sharing and exchanging information. In a embodiment, the communicative information is textual information, numeral information, graphical information, symbolic information, video information, and/or audio information.

The analysis module 20 analyzes the communicative information (e.g., text, images, or sound), generates at least an emotional message related to emotion (e.g., smile, grief, weep, or anger), and determines the identity of the remoter user the communicative information sent to, so as to select a behavior weight value. Alternatively, in another embodiment, the emotional message yields a mark input value corresponding thereto. In a preferred embodiment, the emotional message is a facial expression-specific symbol or descriptive text (for example, adjectives or nouns excerpted from a passage), and the remote user's identity is determined according to identification-related information, such as username, password, or login/logout time.

The storage module 30 stores behavior weight values corresponding to the remote users' identity and coded information corresponding to the behavior weight values.

The learning module 40 determines interactive responses according to the emotional message and the behavior weight values. In a preferred embodiment, the learning module 40 retrieves the coded information from the storage module 30 as soon as the learning module 40 determines that the mark input value matches one of the behavior weight values stored in the storage module 30. Specifically speaking, the learning module 40 further comprises a behavior unit 41 and a weight unit 42. The behavior unit 41 generates a plurality of specific behavioral attributes which represents attributive relationships to the specific behavioral manifestations, determines the behavior weight value corresponding to the remote user's identity, and stores criteria for determination of the coded information corresponding to the behavior weight value. The weight unit 42 creates criteria for determination of corresponding one of the behavior weight values that match the emotional message of different attributes; for example, the emotional message of different attributes (smile, grief, weep, anger, etc.) is selectively correlated with responses of different levels (say, an emotional message about smile can be greeted with different levels of responses, namely titter, smile, belly laugh, wild laugh, and laughing with tears. The learning module 40 determines whether emotional responses are appropriate by the behavior unit 41, selects levels of responses to the emotional message by the weight unit 42, so as to retrieve from the storage module 30 the coded information corresponding to manifestations of specific personality and behavior. In another embodiment, to personalize the remoter users and differentiate verification information, the weight unit 42 creates criteria for determination of track record update based on user-feedback (to be described later).

The output module 50 outputs a physical action corresponding to the coded information retrievable by the learning module 40 and output by the interaction device 100b accessible by the local user. Specifically speaking, the physical action reflects responding behavior with different emotional levels during interactive instant messaging. For instance, the physical action is carried out in the form of mechanism-triggered action, audio output, word output, speech output, textual output, video output, light output, and/or spreading of scent. The output module 50 is electrically connected to an actuation unit 51 for presenting the physical action corresponding to the retrieved coded information and output by the interaction device 100b. In an embodiment, the actuation unit 51 is a mechanical structure, a display device, or an audio amplifier. The mechanical structure is driven by external power (e.g., motor), so as to effectuate physical, mechanical action. The display device is a LED, a LCD monitor, a LED monitor, a plasma monitor, and/or a CRT monitor. The display device, coupled with the data processing device 100a, displays a picture of the physical action. The audio amplifier is a loudspeaker for presenting the physical action by sound.

The feedback module 60 detects and determines, as soon as the output module 50 outputs the physical action, whether the interaction device 100b accessible by the local user receives a feedback signal from the remote user. Upon a negative detection and determination of the receipt of the feedback signal, the learning module 40 stores the behavior weight value in the storage module 30, depending on the mark input value. Upon a positive detection and determination of the receipt of the feedback signal, the feedback module 60 generates different modification values according to the detection result of the feedback signal and sends the modification values to the learning module 40 so as for the learning module 40 to modify the behavior weight values, change the physical action output by the output module 50, and store the behavior weight value modified in the storage module 30. Specifically speaking, the detection result of the feedback signal to the modification values depends on the level of an input signal from the interaction device 100b. The input signal is generated by physical contact, voice activation, image identification, and/or man-machine interface software-based control. Preferably, the physical contact is a tap, a beat, a heavy press, and/or continuous strikes performed by different users, so as to simulate feedback mechanism in giving punishments or rewards.

Figure 2:
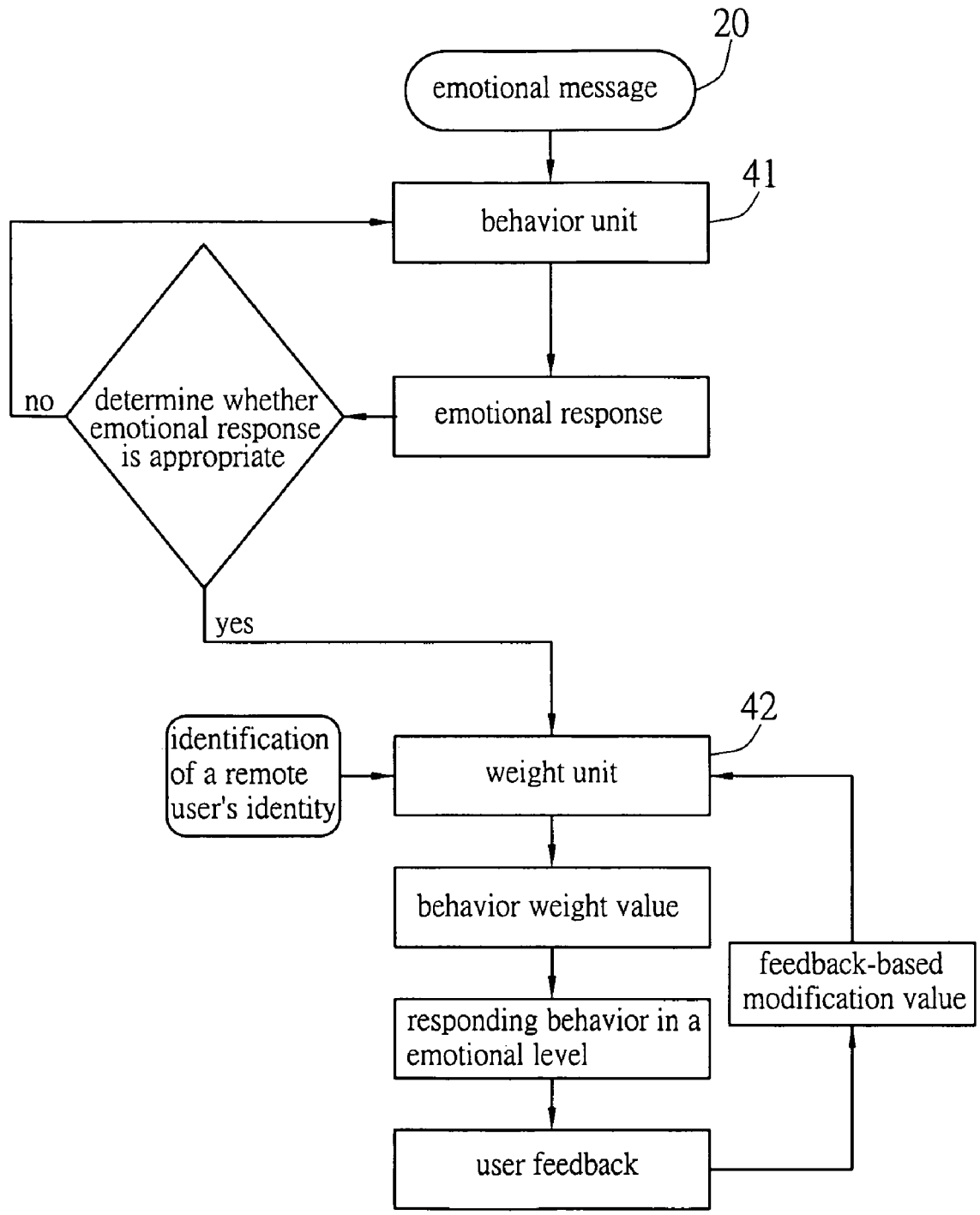
FIG. 2 is a schematic view of criteria for determination performed by the instant messaging interaction system of the present invention.

FIG. 1, coupled with FIGS. 2-6, illustrates operation of the instant messaging interaction system 100 of the present invention. Referring to FIG. 2, which is a schematic view of the instant messaging interaction system 100 and the learning module 40 thereof, once a local user conducts a dialog with at least a remote user by means of the instant messaging module 10 and therefore generates communicative information, the learning module 40 retrieves at least an emotional message through the analysis module 20 so as to generate a mark input value, and selects a weight (e.g., weight 1, 2, . . . , 6) and criteria of determination of emotional responses in behavior corresponding in level to the weight (e.g., behavior 1, 2, . . . , 6) through the behavior unit 41 and the weight unit 42 according to the emotional message and the result of determination of the remote user's identity, so as for the mark input values corresponding to different emotions and generated after at least an emotional message analyzed by the analysis module 20 has been rated according to behavioral manifestation to yield corresponding behavior weight value by computation and therefore reflect specific responding behavior in different emotional levels. In this embodiment, regarding behavior 1-6, criteria of determination used by the learning module 40 are preset interactive behavior, namely behavior 1 (smile), behavior 2 (grief), behavior 3 (weep), behavior 4 (anger), etc., which merely serve an exemplary purpose to illustrate, rather than limit, the present invention.

Figure 3:
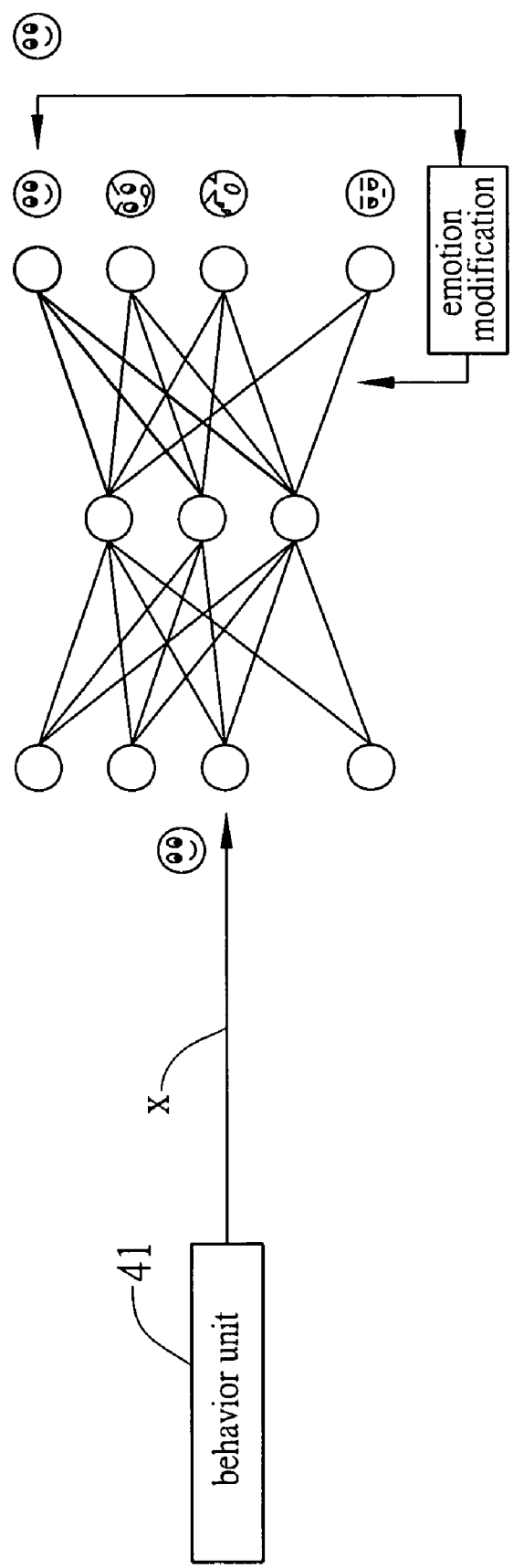
FIG. 3 is a schematic view of operation of a behavior unit of a learning module of the instant messaging interaction system of the present invention.

Referring to FIG. 3, which is a schematic view of operation performed on a mark input value by a behavior unit 41 of the learning module 40 of the instant messaging interaction system 100 of the present invention, the behavior unit 41 of the learning module 40 performs modification of the mark input value with respect to an emotional message as follows:

(1) The inputs, $x=[x_1, x_2, \ldots, x_N]=[x_i]_{1\times N}$, expresses emotions. For example, if the current input is the first representative emotion is, then $x=[1,0,\ldots,0]$.

(2) The learning outputs are $y=[y_1,y_2,\ldots,y_N]=[y_i]_{1\times N}$. For example, if it is the first representative emotion after learning, then $y=[1,0,\ldots,0]$.

(3) The target outputs are $d=[d_1,d_2,\ldots,d_N]=[d_i]_{1\times N}$.

(4) Function of the learning to generate output is $y=f(w\cdot x)$, where w denotes an adjustable behavior weight value configured for modification of emotional learning behavior, and f is an applicable transfer function or activation function, whether linear or non-linear.

Goal of learning:

$$\min \xi(w) = \frac{1}{2}\sum_q (d^{(q)} - y^{(q)})^2$$

Figure 4:
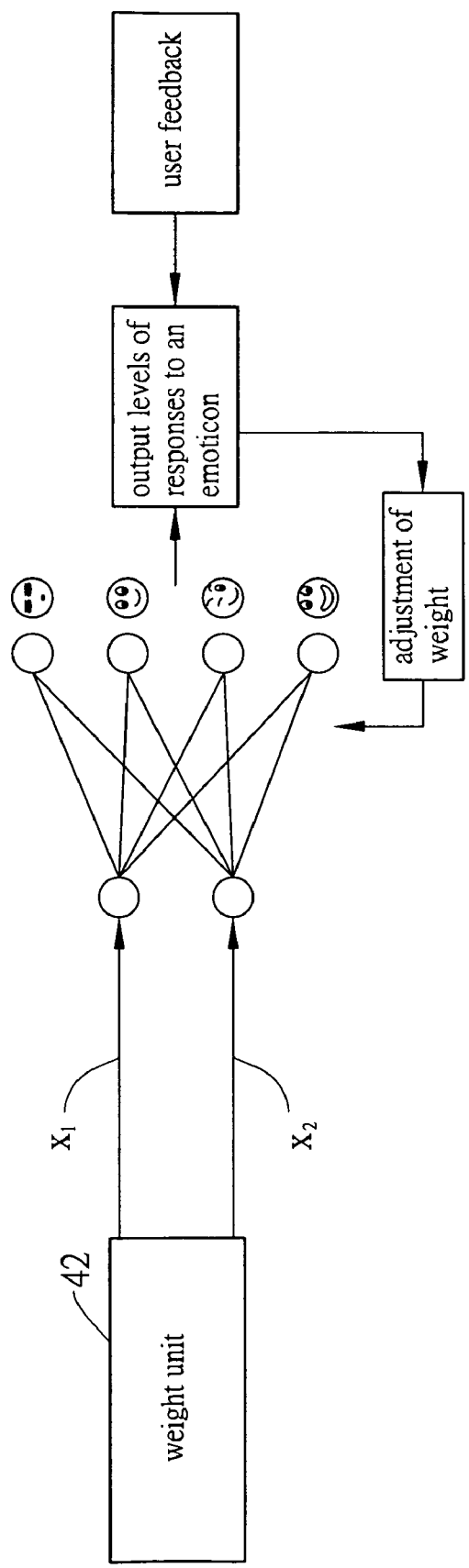
FIG. 4 is a schematic view of operation of a weight unit of a learning module of the instant messaging interaction system of the present invention.

Referring to FIG. 4, which is a schematic view of operation performed on behavior weight values by a weight unit 42 of a learning module 40 of the instant messaging interaction system of the present invention, the weight unit 42 of the learning module 40 determines behavior weight value corresponding to mark input values, according to attributive relationships to the specific behavioral manifestations (i.e., specific behavioral attributes) and the remote user's identity as follows:

(1) Two inputs of $x_1$ and $x_2$, where $x_1$ denotes the remote user's identity, and $x_2$ denotes emotion. Assuming that the second remote user inputs the corresponding emotion level with the second degree, then $x_1=[0,1,\ldots,0]$ and $x_2=[0,2,\ldots,0]$.

(2) The learning outputs are $y=[y_1,y_2,\ldots,y_K]=[y_j]_{1\times K}$. For example, if the learning output value is a behavioral response of the first degree, then $y=[1,0,\ldots,0]$.

(3) The target outputs are user feedback $d=[d_1,d_2,\ldots,d_K]=[d_k]_{1\times K}$.

(4) Function of the learning to generate output is $y=f(w_1\cdot x_1+w_2\cdot x_2)$, where $w_1$ and $w_2$ are behavior weight values adjustable according to the remote user's identity and behavior of different levels of emotional responses: f is an applicable transfer function or activation function, whether linear or non-linear.

(5) Goal of learning:

$$\min \xi(w) = \frac{1}{2}\sum_q (d^{(q)} - y^{(q)})^2$$

Figure 5:
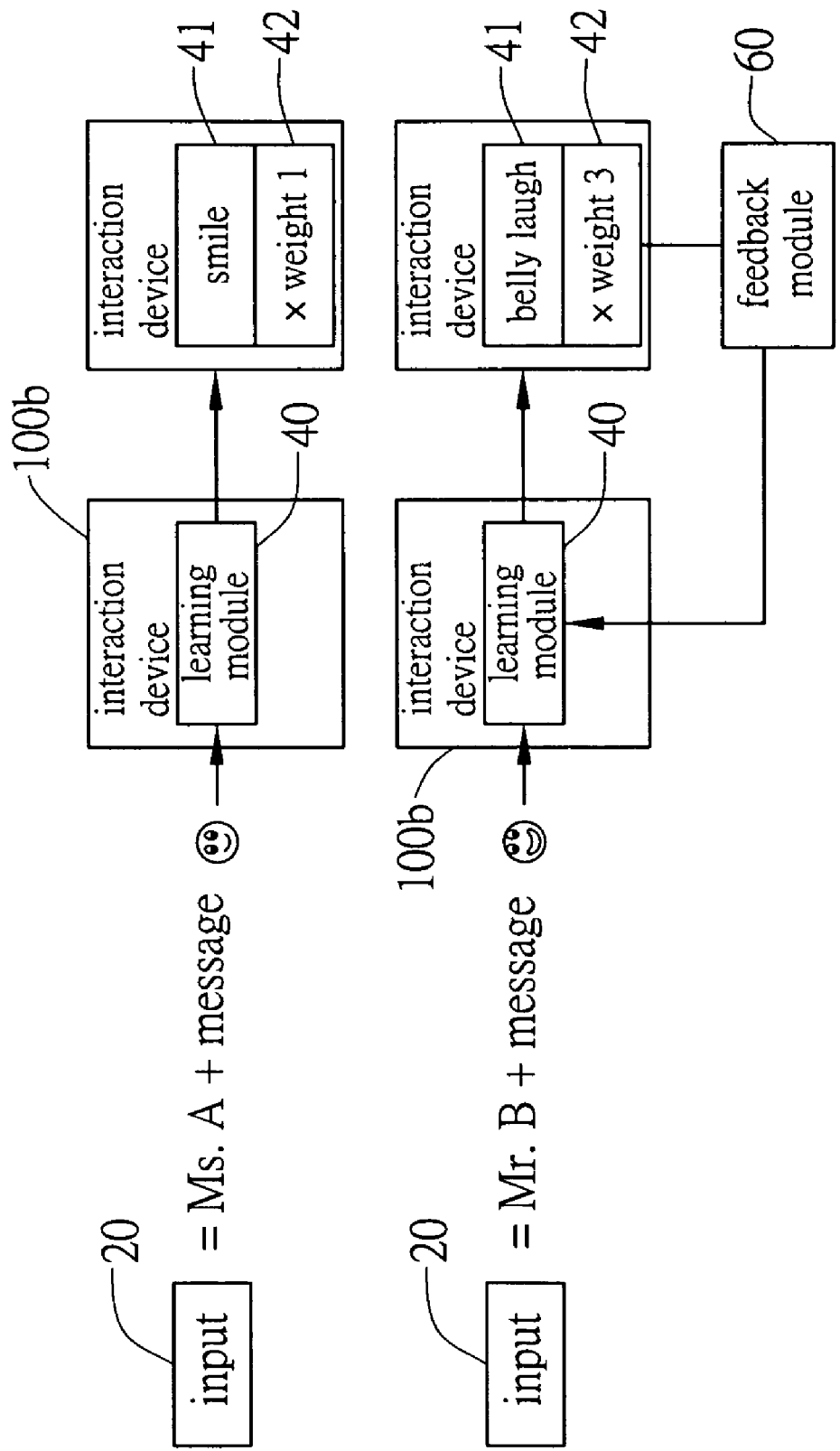
FIG. 5 is a schematic view of a first preferred embodiment of the instant messaging interaction system of the present invention.

Referring to FIG. 5, which is a schematic view of a first embodiment of the instant messaging interaction system of the present invention, upon a local user's receipt of a communicative message of instant messaging from a remote user, Ms. A, the analysis module 20 sends an analyzed emotional message (Input) to the interaction device 100b whereby determination of the communicative information and the remote user's identity takes place. The behavior unit 41 and weight unit 42 of the learning module 40 of the interaction device 100b select the smile behavior corresponding to behavior weight value 1, according to the result of determination of the remote user's identity, that is, Ms. A, and the facial expression-specific symbol (i.e., emoticon) sent by Ms. A. Then, the interaction device 100b presents smile behavior and an interactive response physically. Upon her/his receipt of the smiling interactive response to her/his expectation, the local user stops using the feedback module 60 to request behavior modification from the interaction device 100b again. Afterward, if Ms. A sends the same message of instant messaging again, the interaction device 100b will physically present the smile behavior and the interactive response again.

Figure 6:
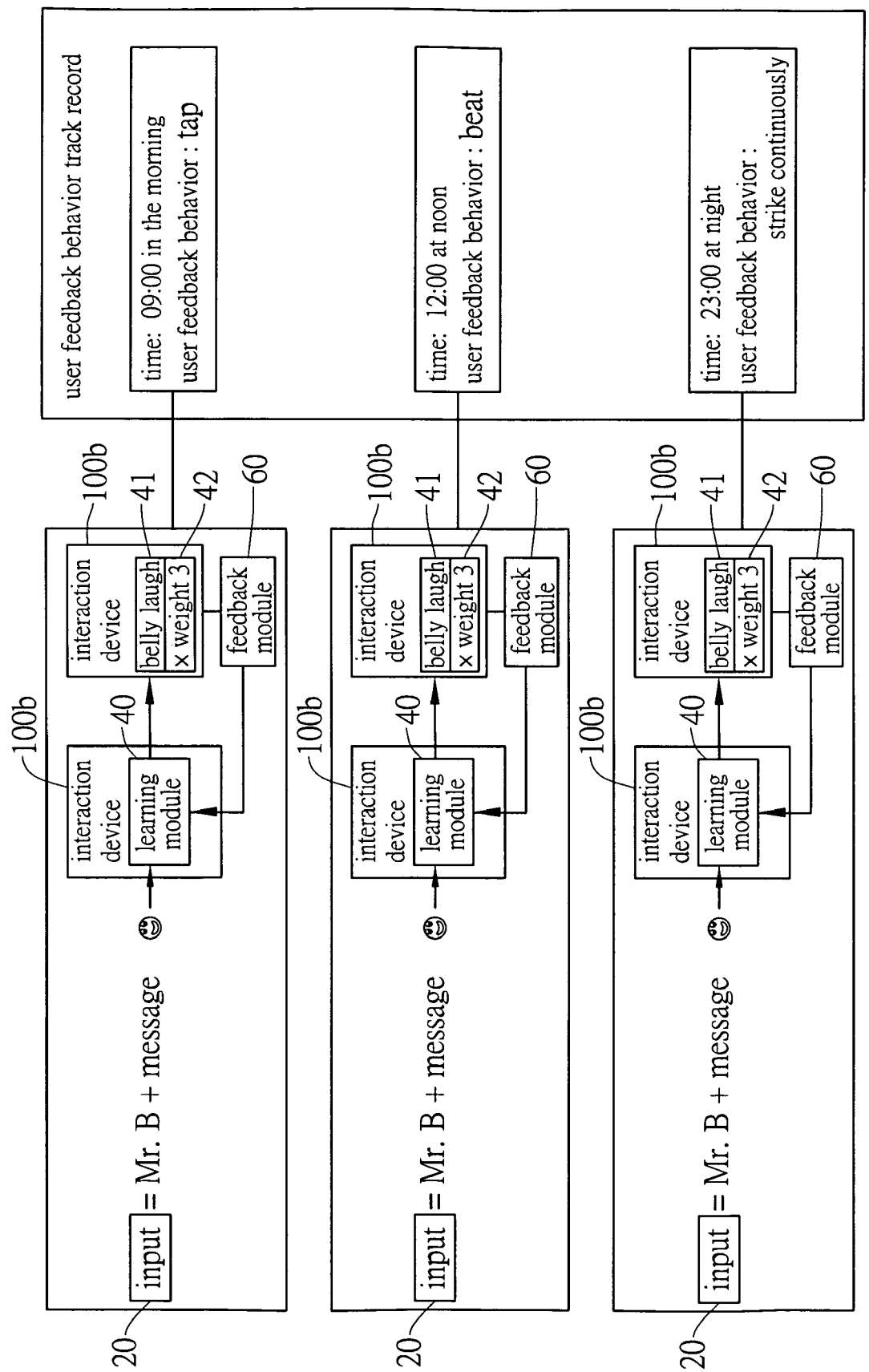
FIG. 6 is a schematic view of a second preferred embodiment of the instant messaging interaction system of the present invention.

Referring to FIG. 6, which is a schematic view of a second embodiment of the instant messaging interaction system of the present invention, the detection result of corresponding to the modification values generated by the feedback module 60 is rated according to a time session, that is, the weight unit 42 creates criteria for determination of track record update based on user-feedback, so as to personalize the remoter users and differentiate verification information. As shown in the drawing, after a local user has received communicative information of instant messaging from a remote user, Mr. B, the analysis module 20 sends an analyzed emotional message (Input) to the interaction device 100b whereby determination of the communicative information and the remote user's identity takes place. The behavior unit 41 and weight unit 42 of the learning module 40 of the interaction device 100b select the smile behavior corresponding to behavior weight value 1, according to the result of determination of the remote user's identity, that is, Ms. A, and the emoticon sent by Ms. A. Then, the interaction device 100b presents smile behavior and an interactive response physically. The local user receives the smiling interactive response to her/his disappointment. Also, the local user sends behavioral modification values to the interaction device 100b depending on a time session of delivery of a message by the feedback module 60, and then sends the behavioral modification values in various corresponding levels to the learning module 40 of the interaction device 100b. For example, at nine o'clock in the morning, the learning module 40 the selection provided by the behavior unit 41 and weight unit 42, according to a "tap" signal from the feedback unit 60, and thus selects "belly laugh" of behavior weight value 3. At twelve o'clock at noon, the learning module 40 modifies the selection provided by the behavior unit 41 and weight unit 42, according to a "beat" signal, and thus selects "belly laugh" of behavior weight value 3. At eleven o'clock at night, the learning module 40 modifies the selection provided by the behavior unit 41 and weight unit 42, according to a "strike continuously" signal, and thus selects "belly laugh" of behavior weight value 3. Afterward, if Mr. B sends messages of instant messaging at different sessions, the interaction device 100b determines, session by session, whether behavior detected by the feedback module 60 is physically presented in the form of "belly laugh" and "interactive responses". Hence, the interaction device 100b eventually manifests behavior and interactive responses corresponding to communicative information and fit for a remote user's identity and a session.

Figure 7:
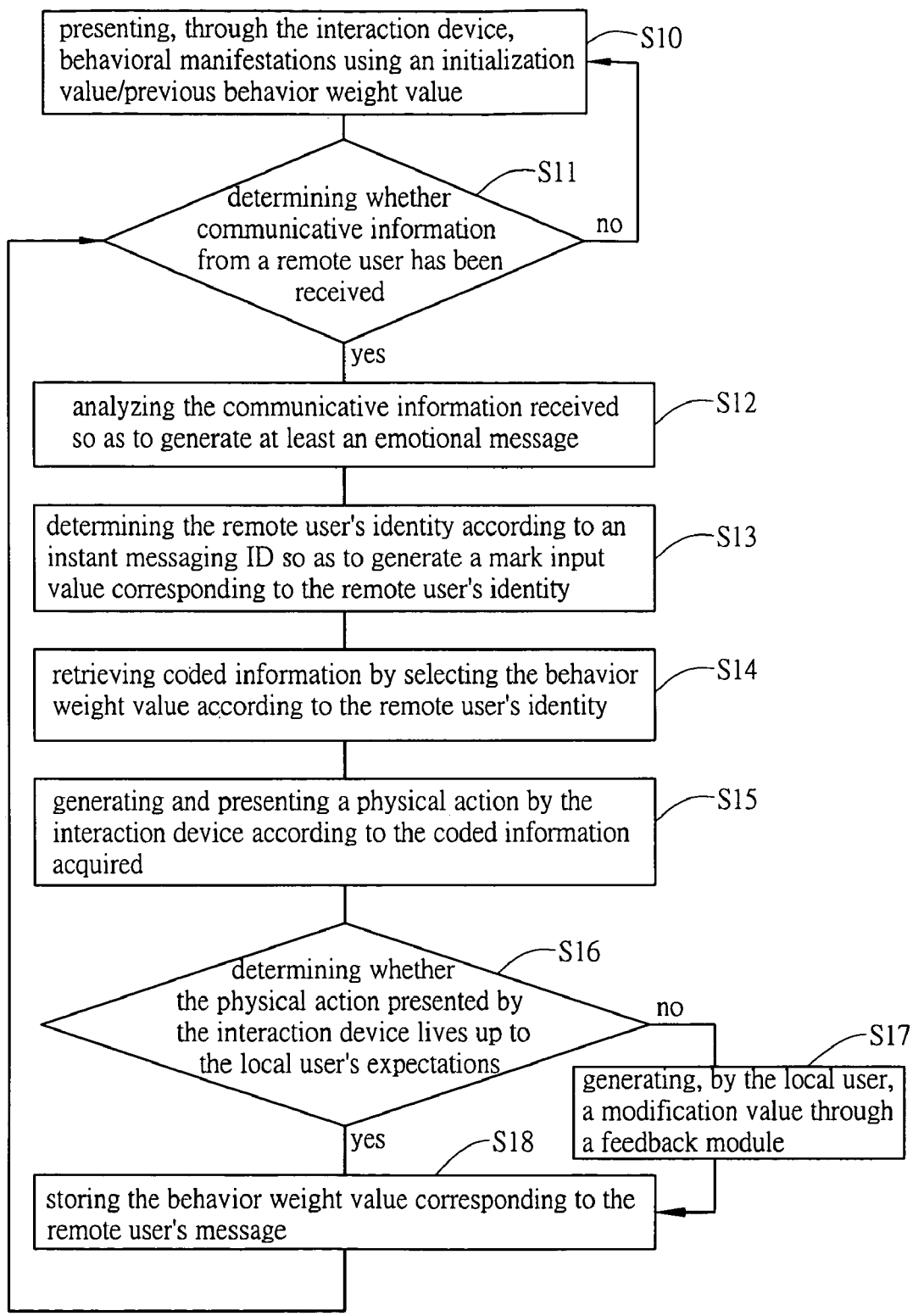
FIG. 7 is a flowchart of a preferred embodiment of the instant messaging interacting method of the present invention.

Referring to FIG. 7, which is a flowchart of an embodiment of the instant messaging interacting method of the present invention, the instant messaging interacting method of the present invention is applicable to a data processing device for executing information messaging software, configured to enable a local user and a remote user to jointly create communicative information by the information messaging software, adapted to allow an interaction device of the local user to present different behavioral manifestations according to the communicative information sent by the remote user and the remote user's identity, and configured for use with a storage module 30 functioning in conjunction with the data processing device 100a and the interaction device 100b (see FIG. 1). The instant messaging interacting method of the present invention begins with Step S10.

Step S10 involves presenting, by the interaction device, a corresponding physical action using an initialization value/previous behavior weight value. In Step S10, the interaction device acquires coded information corresponding to the initialization value/previous behavior weight value stored in the storage module 30, and presents the corresponding physical action according to the coded information acquired. Go to Step S11.

Step S11 involves determining whether the data processing device has received communicative information from a remote user. In Step S11, a positive determination is followed by Step S12 and a negative determination by a return to Step S10.

Step S12 involves analyzing the communicative information received so as to generate at least an emotional message. Go to Step S13.

Step S13 involves determining the remote user's identity according to an instant messaging ID so as to generate a mark input value corresponding to the remote user's identity. In Step S13, the remote user's identity is determined according to the instant messaging ID, and a mark input value corresponding to the at least an emotional message is generated according to a plurality of specific behavioral attributes and the remote user's identity determined. Go to Step S14.

Step S14 involves retrieving coded information by selecting the behavior weight value according to the remote user's identity. In Step S14, upon determination that the mark input value meets a criterion of determination of the behavior weight value stored in the storage module, corresponding coded information is retrieved from the storage module. Go to Step S15.

Step S15 involves taking a physical action by the interaction device according to the coded information acquired. In Step S15, an interaction device 100b accessible by a local user outputs a physical action corresponding to the coded information retrieved from the storage module 30. Go to Step S16.

Step S16 involves determining whether the physical action presented by the interaction device lives up to the local user's expectations. Step S16 further involves detecting and determining whether the interaction device 100b accessible by the local user has received a feedback signal from the local user, wherein the feedback signal is a response given by the local user to the interaction device and configured to indicate whether the physical action presented by the interaction device lives up to the local user's expectations. In Step S16, a positive determination is followed by Step S18 and a negative determination by Step S17.

Step S17 involves generating, by the local user, a modification value through a feedback module. Step S17 further involves detecting for the feedback signal, generating the modification value according to the level of the feedback signal, and modifying the behavior weight value with the modification value so as to change the physical action. Go to Step S18.

Step S18 involves storing the behavior weight value corresponding to the remote user's message in the storage module 30. Go to Step S11.

In conclusion, the present invention is characterized by: generating learning-oriented mark input values by receiving different remote users' instant communicative information or dialog; the interaction device giving responses according to the mark input values; and the users giving feedback (e.g., punishments or rewards) to enable the interaction device to learn to give appropriate and yet different responses according to a remote user' identities. Advantages of the present invention are: supplementing tabulation with variety and graduations; bettering accuracy in the outcome of learning by rated user feedback; allowing the interaction device to learn and thereby give responses that live up to users' expectations rather than random or seemingly meaningless responses; a learning mechanism that spares users the need to preset a list of remote users or an action list, and a feedback mechanism that enables users to guide the interaction device in learning the correct way to give responses; and embodying presentation of various responses to a single message or emoticon in a more emotional and user-anticipated manner.

The foregoing specific embodiments are only illustrative of the features and functions of the present invention but are not intended to restrict the scope of the present invention. It is apparent to those skilled in the art that all equivalent modifications and variations made in the foregoing embodiments according to the spirit and principle in the disclosure of the present invention should fall within the scope of the appended claims.

What is claimed is:

1. An instant messaging system to provide interactions between a local user and a remote user, the system comprising:
    a data processing apparatus that includes a processor and a memory coupled to the processor, the memory storing information messaging software which, when executed, provides
        an instant messaging module for receiving or sending communicative information;
        an analysis module for analyzing the communicative information sent by the remote user so as to generate at least an emotional message, and identifying identity information of the remote user;
        a storage module for storing a behavior weight value which is preset to correspond to the identity information of the remote user;
        a learning module for determining an interactive response according to the emotional message and the behavior weight value so as to generate a physical action;
        an output module for outputting the physical action according to the interactive response determined by the learning module; and
        a feedback module for detecting whether a feedback signal has been received from the local user upon the outputting of the physical action according to the interactive response by the output module,
    wherein if the feedback signal is not received, the learning module does not modify the behavior weight value stored in the storage module;
    wherein if the feedback signal is received, the feedback module generates a modification value corresponding to a level of the feedback signal, the modification value being sent to the learning module to modify the behavior weight value, the behavior weight value stored in the storage module being replaced by the modified behavior weight value; and
    wherein behavior weight values that are stored in the storage module permit the instant messaging interaction system to output different physical actions in response to the communicative information sent by the remote user and the same communicative information sent by a further remote user, having a different identity.

2. The system of claim 1, wherein the instant messaging module enables the local user and the remote user to send and receive the communicative information by the data processing device, and the data processing device is a computer, a cell phone, a personal digital assistant (PDA), or a digital device capable of executing the information messaging software.

3. The system of claim 1, wherein the communicative information comprises at least one of textual information, numeral information, graphical information, symbolic information, video information, and audio information.

4. The system of claim 1, wherein the physical action comprises at least one of mechanism-triggered action, audio output, word output, speech output, textual output, video output, light output, and spreading of a scent.

5. The system of claim 1, wherein the behavior weight value generates a responding behavior with a corresponding emotional level, based on specific behavioral attributes and the identity information of the remote user.

6. The system of claim 1, wherein the detection result of the feedback signal to the modification value in the corresponding level is generated based on a corresponding level of an input signal to the feedback module.

7. The system of claim 6, wherein the input signal is generated by at least one of physical contact, voice activation, image recognition, and human-machine interface software-based control.

8. The system of claim 7, wherein the physical contact comprises at least one of a tap, a beat, a heavy press, and continuous strikes.

9. The system of claim 6, wherein the detection result of the feedback signal to the modification value in the corresponding level is rated based on a time session.

10. The system of claim 1, further comprising an actuation unit electrically connected to the output module, the actuation unit comprising at least one of a mechanical structure, a display device, and an audio amplifier.

11. The system of claim 10, wherein the mechanical structure is driven by external power.

12. The system of claim 10, wherein the display device comprises at least one of a LED, a LCD monitor, a LED monitor, a plasma monitor, and a CRT monitor.

13. The system of claim 10, wherein the audio amplifier is connected to a loudspeaker.

14. An instant messaging interacting method, applicable to a data processing device capable of executing information messaging software to provide interactions between a local user and a remote user, the method comprising the steps of:
    analyzing communicative information sent by the remote user so as to generate at least an emotional message, and identifying an identify information of the remote user;
    retrieving from a storage module a behavior weight value which is preset to correspond to identity information of the remote user;
    determining an interactive response according to the emotional message and the behavior weight value so as to generate a physical action according to the interactive response, and outputting the physical action; and
    detecting whether a feedback signal has been received from the local user,
    wherein if the feedback signal is not received, the learning module does not modify the behavior weight value in the storage module;
    wherein if the feedback signal is received, the feedback module generates a modification value corresponding to a level of the feedback signal, the modification value being sent to a learning module to modify the behavior weight value, the behavior weight value that is stored in the storage module being replaced by the modified behavior weight value; and
    wherein behavior weight values that are stored in the storage module permit an instant messaging interaction system to output different physical actions in response to the communicative information sent by the remote user and the same communicative information sent by a further remote user, having a different identity.

15. The method of claim 14, wherein the data processing device is provided to enable the local user and the remote user to send and receive communicative information and is a computer, a cell phone, a personal digital assistant (PDA), or a digital device capable of executing the information messaging software.

16. The method of claim 14, wherein the communicative information comprises at least one of textual information, numeral information, graphical information, symbolic information, video information, and audio information.

17. The method of claim 14, wherein the physical action comprises at least one of mechanism-triggered action, audio output, word output, speech output, textual output, video output, light output, and spreading of a scent.

18. The method of claim 14, wherein the behavior weight value generates a responding behavior in a corresponding emotional level, based on specific behavioral attributes and the identity information of the remote user.

19. The method of claim 14, wherein the detection result of the feedback signal to the modification value in the corresponding level is generated based on a corresponding level of an input signal.

20. The method of claim 19, wherein the input signal is generated by at least one of physical contact, voice activation, image recognition, and human-machine interface software-based control.

21. The method of claim 20, wherein the physical contact comprises at least one a tap, a beat, a heavy press, and continuous strikes.

22. The method of claim 19, wherein the detection result of the feedback signal to the modification value in the corresponding level is rated based on a time session.

* * * * *